US010999312B2

(12) United States Patent
Viswambharan et al.

(10) Patent No.: US 10,999,312 B2
(45) Date of Patent: May 4, 2021

(54) SYSTEMS AND METHODS FOR PROTECTING A SERVICE MESH FROM EXTERNAL ATTACKS ON EXPOSED SOFTWARE VULNERABILITIES

(71) Applicant: Cisco Technology, Inc., San Jose, CA (US)

(72) Inventors: Rajesh Indira Viswambharan, Karnataka (IN); Prashanth Patil, San Jose, CA (US); Ram Mohan Ravindranath, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 189 days.

(21) Appl. No.: 16/406,585

(22) Filed: May 8, 2019

(65) Prior Publication Data
US 2020/0358802 A1    Nov. 12, 2020

(51) Int. Cl.
*H04L 29/06* (2006.01)
*G06F 9/50* (2006.01)
*H04L 29/08* (2006.01)

(52) U.S. Cl.
CPC ........ *H04L 63/1433* (2013.01); *G06F 9/5072* (2013.01); *H04L 63/105* (2013.01); *H04L 67/28* (2013.01)

(58) Field of Classification Search
CPC .... H04L 63/1433; H04L 67/28; G06F 9/5072
See application file for complete search history.

(56) References Cited

U.S. PATENT DOCUMENTS

| 9,477,845 | B2 | 10/2016 | Boivie et al. |
| 9,519,520 | B2 | 12/2016 | Krueger |
| 10,225,288 | B2 | 3/2019 | Haugsnes |
| 2017/0242784 | A1 | 8/2017 | Heorhiadi et al. |

(Continued)

FOREIGN PATENT DOCUMENTS

CN    109067597 A    12/2018

OTHER PUBLICATIONS

Penso, The Service mesh Mystery—Part 1, Jan. 2019.*

(Continued)

*Primary Examiner* — Minh Dinh
(74) *Attorney, Agent, or Firm* — Polsinelli PC

(57) ABSTRACT

Systems and method handling software vulnerabilities in service meshes can include receiving information on software vulnerabilities from external feeds. From a services catalog which maintains data associated with service instances supported by a service mesh, one or more vulnerable service instances supported by the service mesh are identified. Notifications are provided to sidecar proxies associated with vulnerable service instances. The notifications include criteria such as criticality levels and categories associated with the software vulnerabilities. Based on destination policies for the vulnerable service instances, instructions are provided to the sidecar proxies to trip circuit breakers associated with the vulnerable service instances and thus prevent further access and cascading impact of the software vulnerabilities. The software vulnerabilities are reported to an orchestration system for the service mesh and a fix or different version of the vulnerable service instance is installed where possible.

20 Claims, 7 Drawing Sheets

(56) References Cited

U.S. PATENT DOCUMENTS

2018/0278642 A1    9/2018  Joy et al.
2019/0273746 A1*   9/2019  Coffing ................. H04L 63/105

OTHER PUBLICATIONS

International Search Report and Written Opinion from the International Searching Authority, dated Sep. 10, 2020, 15 pages, for corresponding International Patent Application No. PCT/US2020/031435.

Author Unknown, "Common Vulnerability Scoring System," Wikipedia, Dec. 26, 2015, 12 pages.

Palm, "Service Isolation in Large Microservice Networks," http://www.nada.kth.se, Jun. 11, 2018, pp. 1-47.

* cited by examiner

SYSTEMS AND METHODS FOR PROTECTING A SERVICE MESH FROM EXTERNAL ATTACKS ON EXPOSED SOFTWARE VULNERABILITIES

TECHNICAL FIELD

The subject matter of this disclosure relates in general to the field of cloud computing, and more particularly to protecting a service mesh in a cloud-native infrastructure from software vulnerabilities in service instances supported by the service mesh.

BACKGROUND

With the increasing popularity of cloud-native applications, the use of a service mesh for supporting application services (or "microservices") such as traffic management, security, load balancing, etc., on the cloud-native applications are on the rise. A service mesh may utilize software components controlled by application programming interfaces (APIs), without reliance on discrete hardware appliances. The service mesh architecture may use open source technologies and may expose the cloud-native applications to software vulnerabilities. Cloud-native environments may include a large number of software services (e.g., hundreds or thousands of microservices executing at any given time, with instances of the microservices based on different software versions). In some cases, different software services may be chained together to execute applications. In such environments, identifying the software services which may be impacted when a software vulnerability is detected is very challenging. This problem is exacerbated with an increasing number of software services, some of which may have different versions supported by the cloud-native environment. Furthermore, isolating critical software services and preventing them from interacting with the potentially vulnerable or compromised software services is yet another challenge.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
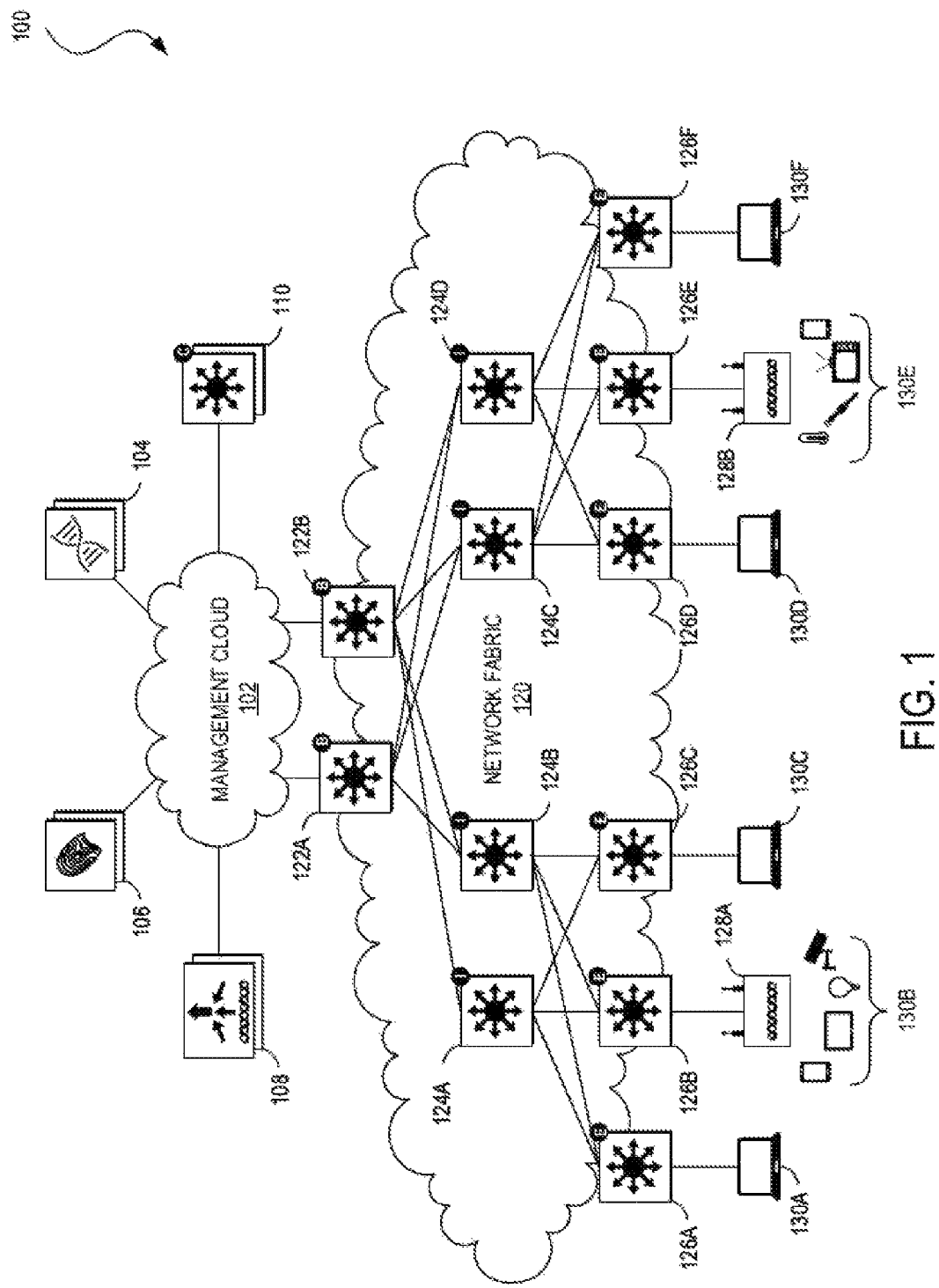
FIG. 1 illustrates a topology of an enterprise network in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and computer-readable media for schemes according to which, software vulnerabilities in service meshes may be effectively identified and handled. In some examples, a method is provided. The method can involve receiving information on one or more software vulnerabilities from one or more external feeds, and identifying, from a services catalog, one or more vulnerable service instances supported by a service mesh, the one or more vulnerable service instances identified as having one or more software vulnerabilities based on the received information, wherein the services catalog comprises data associated with one or more service instances supported by the service mesh. The method can further include providing at least one notification to at least one sidecar proxy associated with at least one vulnerable service instance of the one or more vulnerable service instances, the at least one notification comprising one or more criteria associated with one or more software vulnerabilities of the at least one vulnerable service instance.

In some examples of the method, the one or more criteria can comprise one or more criticality levels associated with the one or more software vulnerabilities of the at least one vulnerable service instance. In some examples of the method, the one or more criticality levels are based on a common vulnerability scoring system (CVSS). In some examples of the method, the one or more criteria comprise one or more categories associated with the one or more software vulnerabilities of the at least one vulnerable service instance.

In some examples of the method, the at least one notification further comprises an instruction to the at least one sidecar proxy to trip a circuit breaker associated with the at least one vulnerable service instance. In some examples of the method, the instruction is based on the one or more criteria and one or more destination policies for the at least one vulnerable service instance. In some examples of the method, tripping the circuit breaker prevents access to the at least one vulnerable service instance and causes requests to access the at least one vulnerable service instance to be returned with a message indicating that the at least one vulnerable service instance is unavailable.

In some examples, the method can further include reporting the one or more software vulnerabilities of the at least one vulnerable service instance to an orchestration system for the service mesh. In some examples of the method, the one or more external feeds comprise one or more cloud consortia, blockchains, or Product Security Incident Response Team (PSIRT) bulletin boards.

In some examples, the method can further include determining a fix to the one or more software vulnerabilities of the at least one vulnerable service instance and providing the fix to the at least one sidecar proxy. In some examples of the method, the fix comprises a version of the at least one service instance unaffected by the one or more software vulnerabilities of the at least one vulnerable service instance. In some examples of the method, the fix comprises a version of the at least one vulnerable service instance including a patch for the one or more software vulnerabilities of the at least one vulnerable service instance.

In some examples of the method, the data associated with one or more service instances in the services catalog comprises one or more of an operating system version, software version, or dependency packages of the one or more service instances.

In some examples, a system is provided. The system can comprise one or more processors and a non-transitory computer-readable storage medium containing instructions which, when executed on the one or more processors, cause the one or more processors to perform operations. The operations can include receiving information on one or more software vulnerabilities from one or more external feeds, and identifying, from a services catalog, one or more vulnerable service instances supported by a service mesh, the one or more vulnerable service instances identified as having one or more software vulnerabilities based on the received information, wherein the services catalog comprises data associated with one or more service instances supported by the service mesh. The operations can further include providing at least one notification to at least one sidecar proxy associated with at least one vulnerable service instance of the one or more vulnerable service instances, the at least one notification comprising one or more criteria associated with one or more software vulnerabilities of the at least one vulnerable service instance.

In some examples of the system, the one or more criteria comprise one or more criticality levels associated with the one or more software vulnerabilities of the at least one vulnerable service instance. In some examples of the system, the one or more criticality levels are based on a common vulnerability scoring system (CVSS). In some examples of the system, the one or more criteria comprise one or more categories associated with the one or more software vulnerabilities of the at least one vulnerable service instance.

In some examples of the system, the at least one notification further comprises an instruction to the at least one sidecar proxy to trip a circuit breaker associated with the at least one vulnerable service instance. In some examples of the system, the operations further comprise reporting the one or more software vulnerabilities of the at least one vulnerable service instance to an orchestration system for the service mesh. In some examples of the system, the operations further comprise determining a fix to the one or more software vulnerabilities of the at least one vulnerable service instance and providing the fix to the at least one sidecar proxy.

Description of Example Embodiments

Disclosed herein are systems, methods, and computer-readable media for schemes according to which, real time and original traffic streams transmitted between source and destination nodes may be selectively chosen, headers thereof truncated, and transmitted to a network controller for network analysis, without interfering with the real time and original traffic streams being forwarded to their destinations. Some example advantages of using the real time and original traffic streams are the reduction of load in both control and data planes as well as significant reduction in complexity of performing network monitoring, performance measurement and detecting network impairments.

Cloud-native environments can include cloud computing systems which employ containers. Containers are a lightweight, efficient and standard way for applications to move between different environments (e.g., an on-premises site, a remote site, etc.) and run independently. In some implementations, a container may hold all the information and data which may be needed for running an application. For example, code, run time, system tools, libraries and settings for an application may be packaged in the container. The use of containers makes it possible to build distributed applications for cloud-native environments.

Different software services may be supported by cloud-native applications. The term "microservice" refers to a software service which may be used for building a distributed application using containers. A microservice architecture treats different functions of a cloud-native application (e.g., security, traffic management, etc.) as independent services that can be altered, updated, or taken down without affecting other applications in the cloud-native environment. In some examples, microservices may be built around business capabilities of a company utilizing a cloud-native environment, and the microservices may be independently deployable using fully automated deployment machinery.

Based on their infrastructure, the cloud-native applications may utilize various software services for functions such as load balancing, traffic managing, routing, health monitoring, security policies, service and user authentication, protection against intrusion, distributed denial of service (DDoS) attacks, etc. In cloud-native applications, these software services may be implemented using microservices constructs, which may involve the provision of a large number (e.g., hundreds or thousands) of containers. Discrete hardware appliances for managing these large numbers of containers are not practical, and hence, a "service mesh" is employed to manage and deliver the microservices which may be integrated within a compute cluster of a cloud-native environment, for example. The service mesh utilizes application programming interfaces (APIs) which do not need hardware appliances for their implementation. In some examples, the service mesh may deliver a pervasive layer of services across all environments that containerized applications and microservices can be connected to.

Thus, the service mesh may be used to deliver services such as traffic management, security, and observability to container-based microservices applications directly within the compute cluster. Since the service mesh provides monitoring, scalability, and high availability services through software components controlled by APIs instead of using discrete hardware appliances, the flexible framework of the service mesh reduces the operational complexity associated with modern, distributed applications. For example, the service mesh delivers application services, such as load balancing without requiring an expensive and challenging alternative such as a physical hardware appliance load balancer at each location and/or each server utilized by the cloud infrastructure.

A service mesh may be implemented using an array of network proxies alongside the containers. Each proxy, referred to as a "sidecar proxy", serves as a gateway to interactions that occur between containers. A sidecar proxy assists in spreading compute load across the service mesh and directing a request to the appropriate downstream container that can serve the request. A central controller may orchestrate the connections in the service mesh, and a control plane may be configured to monitor the service traffic flowing between sidecar proxies. The control plane may deliver access control policies and collects performance metrics to be provided to the orchestrator. The orchestrator may also integrate with platforms such as open-source systems for automating the deployment and management of containerized applications.

In a service mesh infrastructure, each microservice may be developed, deployed and managed independently, as noted above. For example, new features and updates to a microservice may be delivered to the service mesh, sometimes in a rapid and incremental fashion, such that newer versions of microservices may be continually integrated into the cloud-native platform. Micro service-based applications developed in this manner are extremely dynamic as they can be updated and deployed hundreds of times a day, for example. However, given the independent manner in which the numerous microservices, and versions thereof, may be developed and deployed, there may be vulnerabilities in one or more of these microservices. Some vulnerabilities may be severe and cause widespread disruption across the service mesh, while others may be less severe and contained. Identifying the vulnerabilities, recognizing potential containers which may be affected, and taking action based on the criticalities of these vulnerabilities is a challenge. The following sections describe systems and methods for protecting an example service mesh from software vulnerabilities.

FIG. 1 illustrates an example of a topology of an enterprise network 100 which may be configured according to aspects of this disclosure. For example, the enterprise network 100 may include a wired network whose traffic may be monitored according to example techniques herein. In one example, the enterprise network 100 may provide intent-based networking. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some examples, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., Virtual Extensible Local Area Network or "VXLAN") from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment.

In some examples, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 122, 124, and 126.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some examples, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

Figure 2:
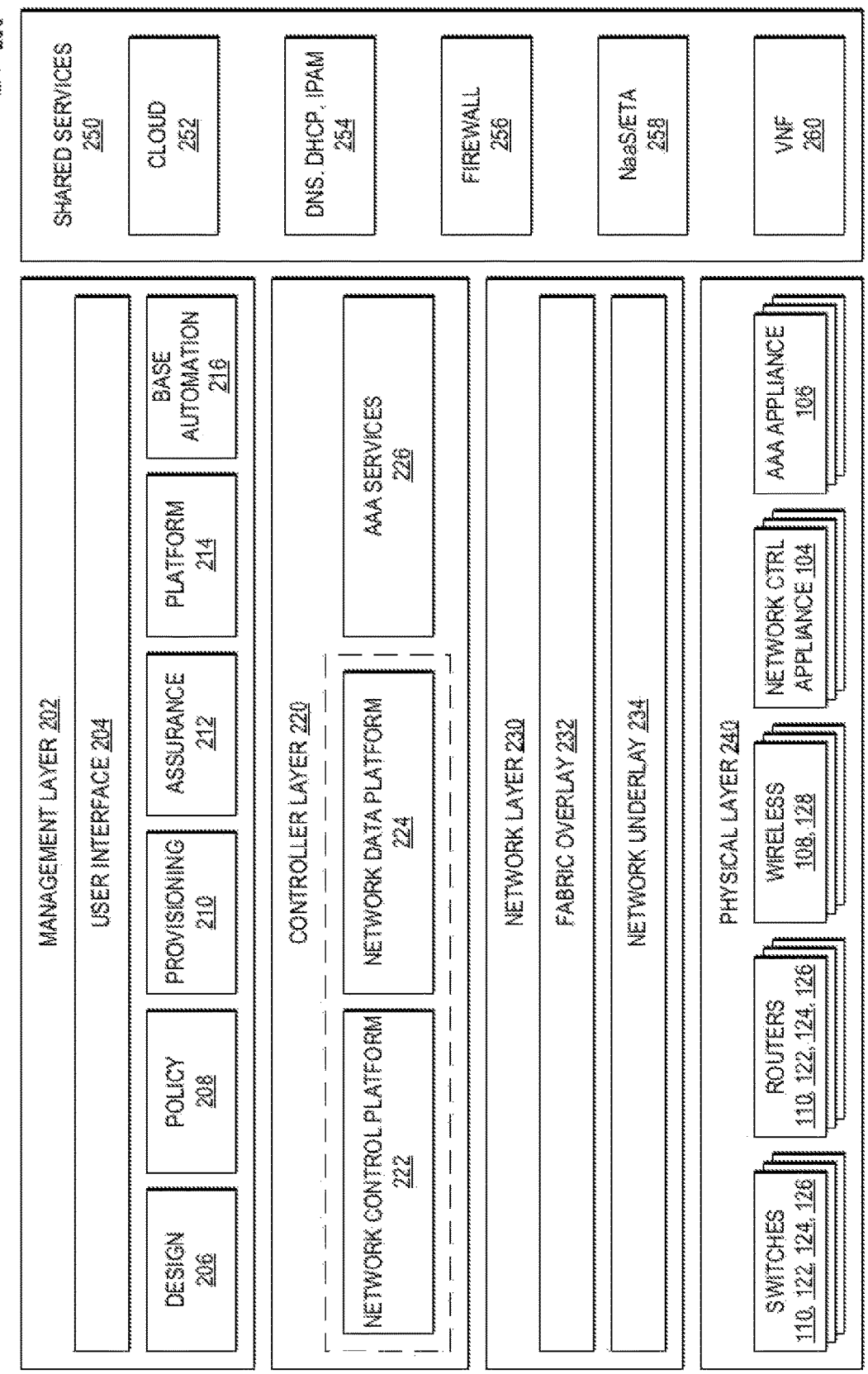
FIG. 2 illustrates a logical architecture for an enterprise network in accordance with some examples.

FIG. 2 illustrates an example of a logical architecture 200 for an enterprise network (e.g., the enterprise network 100). One of ordinary skill in the art will understand that, for the logical architecture 200 and any system discussed in the present disclosure, there can be additional or fewer component in similar or alternative configurations. The illustrations and examples provided in the present disclosure are for conciseness and clarity. Other examples may include different numbers and/or types of elements but one of ordinary skill the art will appreciate that such variations do not depart from the scope of the present disclosure. In this example, the logical architecture 200 includes a management layer 202, a controller layer 220, a network layer 230 (such as embodied by the network fabric 120), a physical layer 240 (such as embodied by the various elements of FIG. 1), and a shared services layer 250.

The management layer 202 can abstract the complexities and dependencies of other layers and provide a user with tools and workflows to manage an enterprise network (e.g., the enterprise network 100). The management layer 202 can include a user interface 204, design functions 206, policy functions 208, provisioning functions 210, assurance functions 212, platform functions 214, and base automation functions 216. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some examples, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 214 can support the top-level functions by allowing users to perform certain network-wide tasks.

Figure 3:
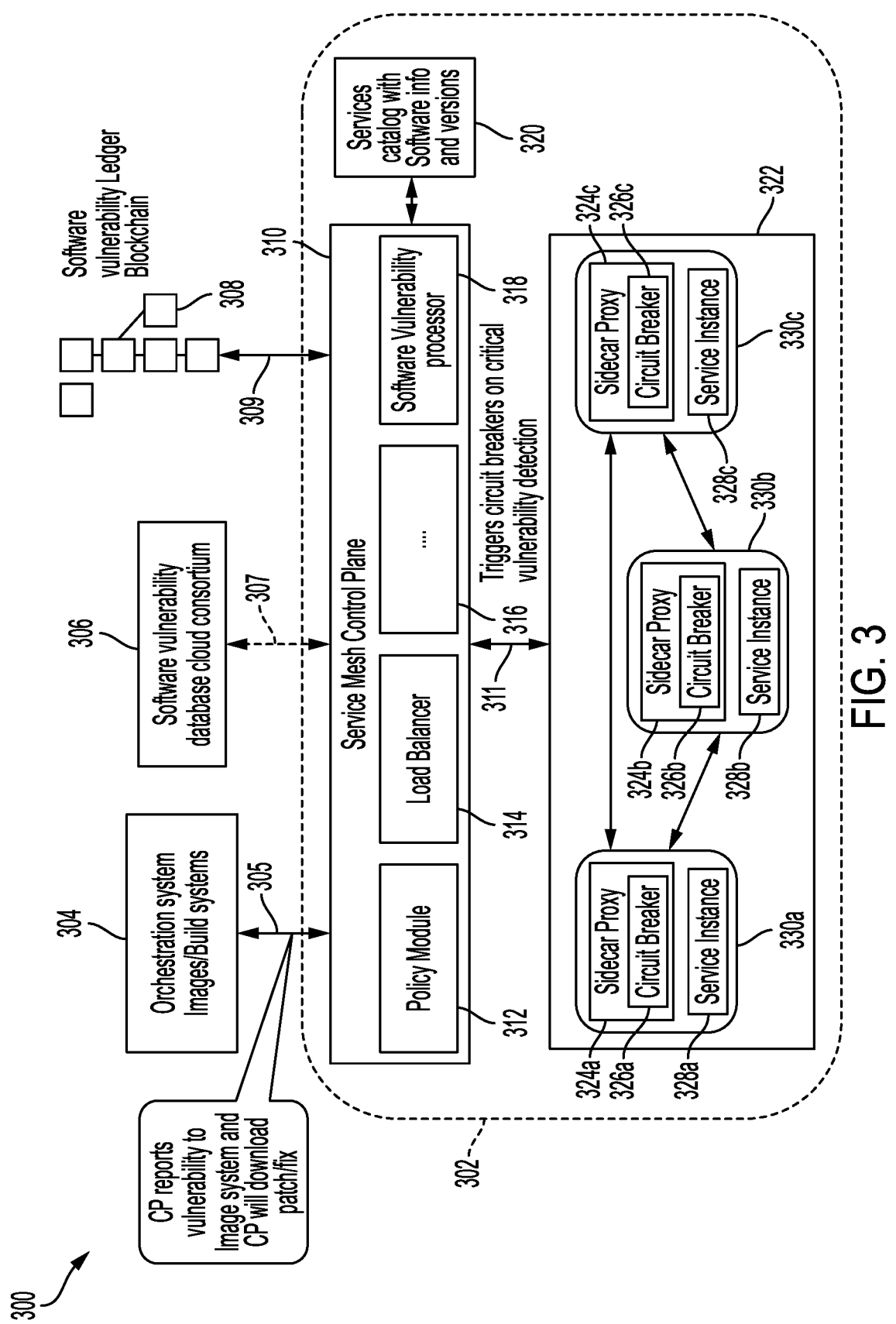
FIG. 3 illustrates a service mesh in coordination with external feeds for obtaining information about software vulnerabilities in accordance with some examples.

FIG. 3 illustrates an example topology of a network 300 configured to implement aspects of this disclosure. The network 300 may be an enterprise network for supporting cloud-native applications. In some aspects, the network 300 may be include an example implementation of the enterprise network 100 of FIG. 1 whose logical architecture 200 was described with reference to FIG. 2 above.

For example, the network 300 illustrates a service mesh 302 which may provisioned with a network fabric such as the network fabric 120 of FIG. 1. The service mesh 302 may be a software defined network (SDN) and include a centralized control plane 310 that configures the data plane of the service mesh 302. The service mesh 302 provides an infrastructure layer for governing service-to-service communications. The service mesh 302 includes an array 322 of network proxies. Among the various network proxies which the array 322 may include, sidecar proxies 324a-c are illustrated, and will be explained in more detail below.

As will be understood by one skilled in the art, enterprise networks may use proxies for implementing security measures and managing accesses to services. For example, if a user in an office environment of a company requests a webpage from a computer in the office, then the request may first be received by a web proxy of the company which may check the request for security issues. Once the security measures implemented by the web proxy are cleared, then the request may be sent to an external server that hosts the web page. When the web page is returned back to the computer in response to the request, the web proxy may once again check the content in the web page being returned for security issues, and then the proxy returns the web page and its contents of the web page to the user. In the service mesh 302, requests are routed between microservices through proxies in their own infrastructure layer. For this reason, individual proxies that make up a service mesh are referred to as sidecars or sidecar proxies, since they run alongside each service, rather than within them. The sidecar proxies 324a-c are examples of such sidecar proxies which may be present in the service mesh 302.

A sidecar proxy may handle access and security measures for one or more service instances to which the sidecar proxy is paired. For example, service instances 328a-c are shown in FIG. 3, paired with respective sidecar proxies 324a-c. Further, a service instance and its paired sidecar may proxy share a container. For example, containers 330a-c are shown, wherein each container 330a-c may be shared by a respective service instance 328a-c and sidecar proxy 324a-c. The sidecar proxies 324a-c may handle communication with service instances of other containers. For example, the sidecar proxy 324a of the container 330a may handle communication of the service instance 328a with the service instance 328b of the container 330b. The sidecar proxies 324a-c may also support capabilities such as discovery of service instances, load balancing, authentication and authorization, secure communications, etc., in the service mesh 302. The service instances 328a-c may be microservices. As previously explained, the microservices may be a specialization of an implementation approach for service-oriented architectures (SOA) used to build flexible, independently deployable software systems.

The control plane 310 may handle the control functions for the service mesh 302, as previously mentioned. For example, the control plane 310 may install and maintain policy and configuration on the service instances 328a-c (e.g., through respective sidecar proxies 324a-c). The control plane 310 may instructs the sidecar proxies 324a-c with dynamic updates to these policies and configurations in some examples. Accordingly, the control plane 310 may include different modules for carrying out these functions. For example, the control plane 310 may include a policy module 312 for defining and managing network policies, traffic policies, etc. The control plane 310 may also include a load balancer 314 for implementing load balancing schemes for balancing the traffic and workloads in the service mesh 302. One or more other modules which may be present in the control plane 310 are generically shown as the module 316, for performing the one or more control functions discussed with reference to the control layer 220 in FIG. 2, for example.

In example aspects, the control plane 310 may include a software vulnerability processor (SVP) 318 for handling the various functions related to identifying, isolating, and rectifying software vulnerabilities, for example. In one or more examples, the SVP 318 (or more generally, the control plane 310) may be in communication with a services catalog 320. The services catalog 320 may maintain a catalog of various details, such as the software versions, origin, release date, etc., for the software running in the various service instances 328a-c of the service mesh 302, for example. Accordingly in some examples, the services catalog 320 may contain an up to date mapping of the software (and version thereof) and the service instances 328a-c. The services catalog 320 may be updated in one or more manners, which will be described below.

As shown in FIG. 3, the control plane 310 of the service mesh 302 may communicate with one or more external entities. Among these, an orchestration system 304 may work in coordination with the service mesh 302 for deployment, scaling, and management of containerized applications such as in the containers 330a-c of the service mesh 302. For example, open-source orchestration systems are known in the art for automatic management or containerized applications. The orchestration system 304 may, among other functions, maintain the state of workloads/applications, container images, network resources, etc.

The service mesh 302 may also be in communication with various other external feeds 307, 309, etc., for obtaining information on potential vulnerabilities in the software executing in its containers 330a-c, for example. The software vulnerabilities discussed herein may pertain to any exposures identified in the service instances which may compromise privacy, security, efficiency, accuracy, performance, etc., of the service instances. In some examples, the vulnerabilities may be program bugs, loopholes in service and user authentication, gaps in protection against intrusion, exposure to distributed denial of service (DDoS) attacks, etc.

The potential software vulnerabilities may or may not have a fix readily available. A software vulnerability database cloud consortium 306 may source vulnerability information from various repositories and standards, such as the National Vulnerability Database (NVD), Product Security Incident Response Team (PSIRT), etc., and supply this information on the external feed 307 to the service mesh 302. The software vulnerability ledger blockchain 308 may provide another external feed 309 to the service mesh 302 with vulnerabilities obtained from blockchain ledgers and other distributed ledgers, for example. Although not exhaustively shown and described, various other such external feeds may provide information to the service mesh 302 about any software vulnerabilities which have been identified in the industry, publicly known, or sourced from private entities.

In one or more examples, the control plane 310, or more specifically, the SVP 318 may interact with these external feeds 307, 309, etc., and gather software vulnerability and remediation information. In some examples, the SVP 318 may implement the following processes detecting vulnerabilities which may affect the service mesh 302. The SVP 318 may monitor the external feeds 307, 309 and consult the services catalog 320 to determine if any vulnerability is reported on the external feeds 307, 309 which may affect one or more services in the services catalog 320. Further, as and when any new services are added in the service mesh 302 or service discovery functions identify new services in the service mesh 302, the SVP 318 may update the services catalog 320 and monitor the external feeds 307, 309 to determine if any new or updated information added to the services catalog 320 may have vulnerabilities reported by the external feeds 307, 309.

In one or more examples, upon identifying a software vulnerability in one or more services maintained in the services catalog 320, the SVP 318 may obtain a complete Common Vulnerabilities and Exposures (CVE) information. The CVE information may include, among other things, the identity and the criticality of the vulnerability. In one example, the identity may reveal a specific service instance 328a of the service instances 328a-c.

In some examples, an industry standard scoring system, such as a Common Vulnerability Scoring System (CVSS) may be used to classify the criticality of the identified vulnerability. Using such a scoring system allows handling of different vulnerabilities based on their severity levels. While any scoring system or classification system may be used, the CVSS, for example, provides a way to capture the principal characteristics of a vulnerability and produce a numerical score reflecting the severity of the vulnerability. The numerical score can then be translated into a qualitative representation (e.g., low, medium, high, and critical) to help in assessing and prioritizing the handling of the vulnerability.

Further, in some aspects, it is possible to identify different categories of the vulnerabilities. For example, the vulnerability may be categorized as being database related, messaging related, memory related etc.

The CVE obtained by the SVP 318 may further include a determination of symptoms and remedies associated with the detected vulnerability. Any policies about handling the detected vulnerabilities may also be determined. Based on any one or more of the above criteria such as the identity of the vulnerable service instances, the severity of the vulnerability, the category, the policies, etc., the SVP may alert one or more sidecar proxies associated with the vulnerable service instances.

In some examples, the SVP 318 may evaluate the impact of the vulnerability on the identified service instances, e.g., based on the above criteria, and provide alerts to the sidecar proxies of the respective service instances. In some examples, the SVP 318 may utilize specific policies for determining whether to alert a sidecar policy based on the above criteria. In an example wherein the policy is based on criticality levels or a CVSS score, for example, a count of a number of vulnerabilities that can be tolerated for each criticality level may be determined by the policy.

For example, if the criticality level is "low" based on a low CVSS score, for example, then then a particular service instance may tolerate up to a count of 5 vulnerabilities in one illustrative example. Therefore, the sidecar proxy for that service instance need not be alerted until five vulnerabilities are discovered for the service instance. Similarly, in an illustrative example, a count of 2 may be used for a "medium" vulnerability score and a count of 1 for a "high" vulnerability score. However, in an illustrative example, a count of 0 may be tolerated for a "critical" vulnerability score, in the sense that no vulnerabilities are tolerated and the sidecar proxy may be notified immediately if a vulnerability of "critical" vulnerability score is detected.

In some examples, the SVP 318 may alert a sidecar based on the above policies and one or more identified vulnerabilities. For example, the SVP 318 may alert the sidecar proxy 324a based on the above policies and one or more identified vulnerabilities for the service instance 328a. One or more triggers 311 shown in FIG. 3 may represent signaling used for transmitting such alerts from the control plane 310 to the sidecar proxies 324a-c. In some examples, the SVP 318 may provide notifications of the policy and the vulnerability scores to the sidecar proxies and allow the sidecar proxies to determine what further action to take, based on the counts and the criticality levels.

In some examples, the sidecar proxies may trip circuit breakers for their associated service instances upon receiving such an alert or trigger 311 regarding software vulnerabilities, and based on policies pertaining to the software vulnerabilities. Circuit breakers 326a-c are illustrated for sidecar proxies 324a-c. This processes implemented by a sidecar proxy for preventing access to a vulnerable service instance and isolating the vulnerable service instance from responding to future requests and/or propagating the software vulnerabilities further is referred to as "tripping a circuit breaker". This term, "tripping a circuit breaker" is merely used to represent a conceptual analogy to an electrical system which uses a circuit breaker to minimize downstream impact of an electrical fault, but the term "tripping a circuit breaker" does not convey any actual or physical similarities to an electrical system or related functions of tripping a circuit breaker. The circuit breakers may be software constructs which are designed to prevent failures from cascading across the micro service network. Upon tripping a circuit breaker, the circuit breaker transitions to an open mode and the associated service instance returns a cached (or default) response to its upstream micro services in some examples. For example, upon tripping the circuit breaker 326a, the sidecar proxy 324a will automatically return a "service unavailable" message in response to any requests received for the service instance 328a, and deny access to the service instance 328a. In this manner, the sidecar proxy 324a may isolate the service instance 328a upon receiving an alert from the SVP 318 that the service instance 328a has a potential vulnerability of a critical vulnerability score. Thus, further cascading impacts of the vulnerability, e.g., to the service instances 328b-c of the containers 330b-c may be avoided, for example.

In some examples, the control plane 310, or more specifically, the SVP 318 may also export all relevant vulnerability information and any terminated services information to the orchestrator system 304, using the export signal 305. Any new requests which may be directed to those vulnerable services may be blocked by the orchestration system 304 and/or the service mesh 302. Further, new instances of the vulnerable services will not be spawned.

In some aspects, the SVP 318 may further process the CVE and consult respective vulnerability databases to determine if there is a software version in the services catalog 320 which has a fix to the identified vulnerability in a different version of the same software. For example, if the services catalog 320 indicates availability of a different version of the service instance 328a which does not have the vulnerability (e.g., an existing version which never had the vulnerability or a version which has a patch to the vulnerability installed), then the SVP 318 may try to revert or roll back to the version of the service instance 328a which does not have the vulnerability. In some aspects, the SVP 318 may identify a website (e.g., Uniform Resource Locator or "URL") or remote server location which may have a version with a fix or a patch for the vulnerability available and initiate a download of the fixed version or the patch. The SVP 318 may coordinate with the orchestration system 304 if automatic patching of software is supported for the vulnerable services, and if so, the vulnerable service, e.g., the service instance 328a in the above example may be automatically fixed and restored. In some examples, the SVP 318 may coordinate with any other build system or alert an administrator or system for manual intervention for installing a fix.

Figure 4:
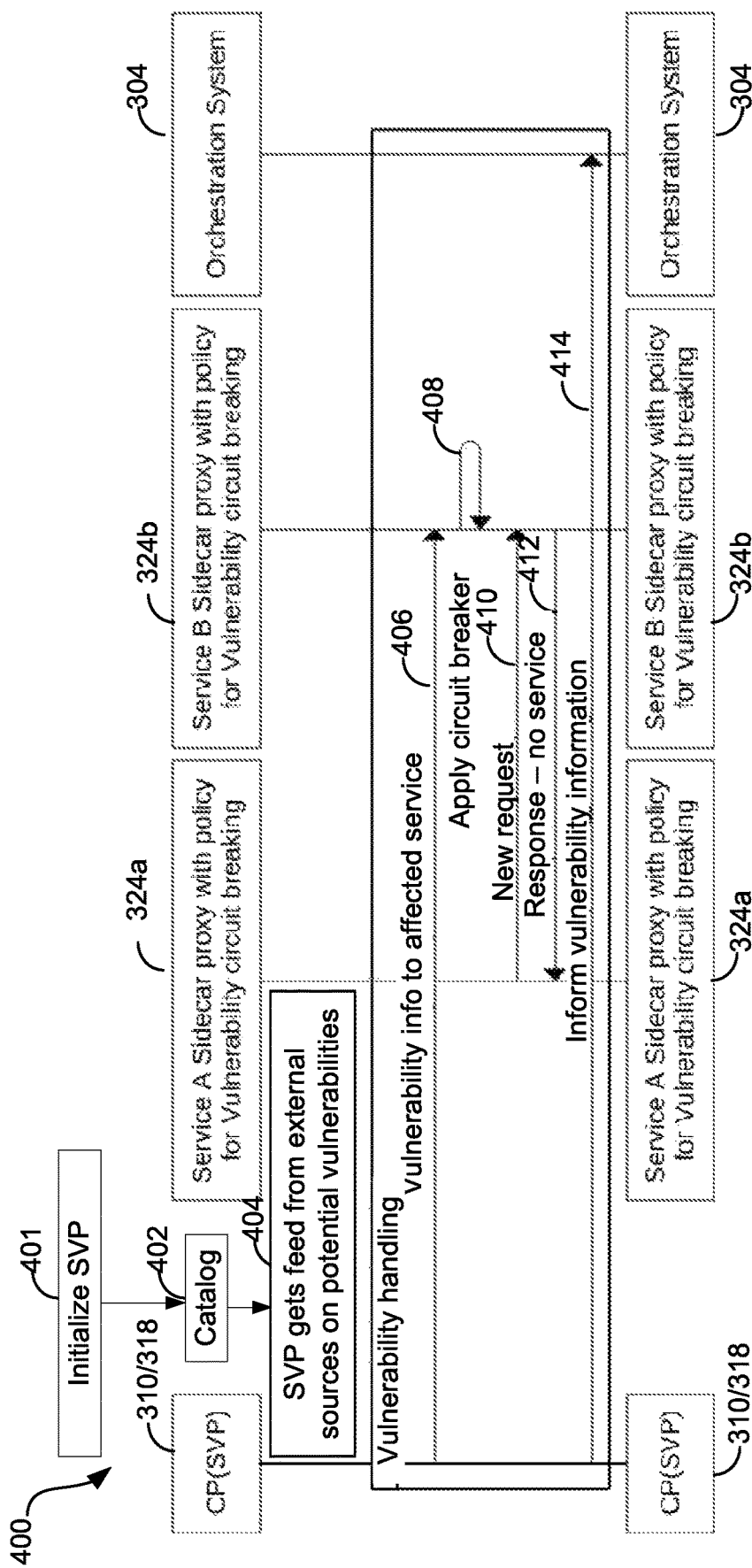
FIG. 4 illustrates a process of identifying and handling software vulnerabilities in service instances of a service mesh in accordance with some examples.

With reference now to FIG. 4, a process 400 is shown for identifying and protecting the service mesh 302 from potential attacks on exposed software vulnerabilities.

In various aspects, the process 400 may begin with a step 401 for initializing the SVP 318 of the control plane 310. In some aspects, the SVP 318 may first be initialized before its first deployment in the process 400. In this regard, the SVP 318 may perform processes for service discovery to determine software versions of all services running in the service mesh 302. For example, the SVP 318 may discover the various service instances 328a-c in containers 330a-c and their relevant software information such as version, date, origin, etc., during the initialization process. The SVP 318 may also add hooks in the infrastructure of the service mesh 302 to get notifications for any new software instantiations/deployments. In some aspects, if the SVP 318 has already been initialized in an already existing deployment, then in the step 401, the SVP 318 may perform a service discovery to determine software versions of all the software instances and determine if any of the versions have been updated.

In the step 402, the SVP 318 may build a catalog of the services discovered in the step 401 for all service instances running in the service mesh 302. The catalog may be stored and maintained in the services catalog 320. The services catalog 320 may contain one or more types of information about the service instances. For example, the information in the services catalog 320 may include one or more of an operating system (OS) version, software version, dependency packages, etc., associated with the service instances. Other metadata such as a release date, developer information, license information, etc., may also be stored in the services catalog 320.

In the step 404, the SVP 318 may receive notifications of vulnerabilities from one or more external feeds. For example, the external feed 307 may provide vulnerability information obtained from database cloud consortia. In another example, the external feed 309 may provide vulnerability information provided by software vulnerability blockchains or other public ledgers. Various other external feeds such as from the NVD, PSIRT, etc., may also be received by the SVP 318. Upon receiving each notification of a vulnerability, the SVP 318 obtains the service instances which may be affected by these vulnerabilities. The SVP 318 walks through the services catalog 320 to determine if any of the service instances in the service mesh 302 match or correspond to the one or more service instances obtained from the notification as being vulnerable.

In the step 406, the SVP 318 may determine the vulnerability score and destination policies pertaining to any vulnerabilities identified in the one or more service instances in the step 404. Sidecar proxy 324a and sidecar proxy 324b have been illustrated, representatively for service instance A 328a and service instance B 328b. In some examples, the SVP 318 may provide the vulnerabilities and the policies to the respective sidecar proxies which may be associated with service instances identified as having vulnerabilities.

In the illustrative example shown, the sidecar proxy 324b is notified that the service instance B 328b has an identified vulnerability. The SVP 318 provides information such as the criticality score to the service instance B 328b. In some examples, the destination policy for the service instance B 328b may also be provided by the SVP 318. In some examples, the sidecar proxy 324b may already have the associated destination policy for service instance B 328b. The destination policy may define custom metrics or settings for the service instance B 328b that the sidecar proxy 324B watches. Examples of the settings include, for each of the criticality scores such as critical, high, medium, low, the associated level of impact. Additionally, the settings may also include, for each of the criticality scores, the count of the number of vulnerabilities tolerated for that score. Various other settings may be defined for each deployment of a service with different restrictions and rules. In some examples, the specific policies and criticality scores may be used for tripping circuit breakers of sidecar proxies.

For instance, when the SVP 318 sends notifications in the step 406 to the sidecar proxy 324b, the sidecar proxy 324b may receive this notification in the step 408. In the step 408, based on the criticality level and policy, the sidecar proxy 324b may trip the circuit breaker 326b shown in FIG. 3. In one example, tripping the circuit breaker 326b may be an event which occurs when the SVP 318 notifies the sidecar proxy 324b that a vulnerability with a critical vulnerability score has been identified for service instance B 328b, which causes the sidecar proxy 324b to trip the circuit breaker 326b immediately, without waiting for a larger count of the vulnerabilities to be received and accumulated.

In the step 408, upon tripping the circuit breaker 326b, the sidecar proxy 324b is configured to automatically deny future requests for access to the service instance B 328b. In some examples, the sidecar proxy 324b may return a notification such as "Service Unavailable" for any future requests to the service instance B 328b. This is demonstrated in the steps 410-412, wherein, when the service instance A 328a sends a new request to access the service instance B 328b in the step 410, the sidecar proxy 324b returns a "Service Unavailable" notification to the service instance A 328a (or to its sidecar proxy 324a) in the step 412.

Tripping the circuit breaker 326b on the affected service instance B 328b in this manner as illustrated in the steps 408-412, for example, may efficiently and immediately ensure that all other calling services are blocked from accessing the service instance B 328b. Thus, a potentially cascading impact of the vulnerability identified for the service instance B 328b may be prevented.

In some examples, in addition to implementing the above steps of preventing access to future requests and returning a "Service Unavailable" notification, service discovery can also reflect the status of the affected services upon tripping the circuit breaker. For instance, service discovery processes by the SVP 318 may return a status which reflects that the circuit breaker 326b has been tripped for the container 330b which includes the affected service instance B 328b. In this regard, the term, affected services conveys any service instance which has been identified as having a vulnerability, and in some examples, a circuit breaker for the service instance may have been tripped.

In the step 414, the SVP 318 may informs the orchestration system 304 of the identified vulnerability in the service instance B 328b, and the subsequent events implemented by the sidecar proxy 324b to trip the circuit breaker 326b. The orchestration system 304 may use this information to upgrade or downgrade the service instance B 328b to a different version which is not affected by the vulnerability in some examples. In some examples, the orchestration system 304 may scale down/deletes existing containers with vulnerabilities, such as the container 330b, and deploy new containers with new software versions for performing the service instance B.

In some examples, the SVP 318 may determine whether a service similar to the service instance B 328b exists in the service mesh 302 (e.g., a different version of the service instance B) which is not affected by the vulnerability. If such a similar service instance is identified, e.g., from the services catalog 320, then the pertinent information may be shared with the sidecar proxy 324b, for example. The sidecar proxy 324b can act as a proxy and redirect calls to the service instance B 328b to its safer similar service in this example.

In some examples, the SVP 318 may determine if there is a software version in the services catalog 320 which has a fix to the identified vulnerability in a different version of the same software. For example, if the services catalog 320 indicates availability of a different version of the service instance B 328b which does not have the vulnerability (e.g., an existing version which never had the vulnerability or a version which has a patch to the vulnerability installed), then the SVP 318 may try to revert or roll back to the version of the service instance B 328b which does not have the vulnerability. In some aspects, the SVP 318 may identify a website (e.g., Uniform Resource Locator or "URL") or remote server location which may have a version with a fix or a patch for the vulnerability available and initiate a download of the fixed version or the patch. The SVP 318 may coordinate with the orchestration system 304 if automatic patching of software is supported for the vulnerable services, and if so, the vulnerable service, e.g., the service instance B 328b in the above example may be automatically fixed and restored. In some examples, the SVP 318 may coordinate with any other build system or alert an administrator or system for manual intervention for installing a fix.

Accordingly, aspects of this disclosure are directed to efficient techniques for protecting a service mesh from potential attacks on service instances which may be exposed software vulnerabilities. In some examples, the identification of software instances which may be vulnerable may be based on coordination with external feeds such as blockchains or other consortia.

Figure 5:
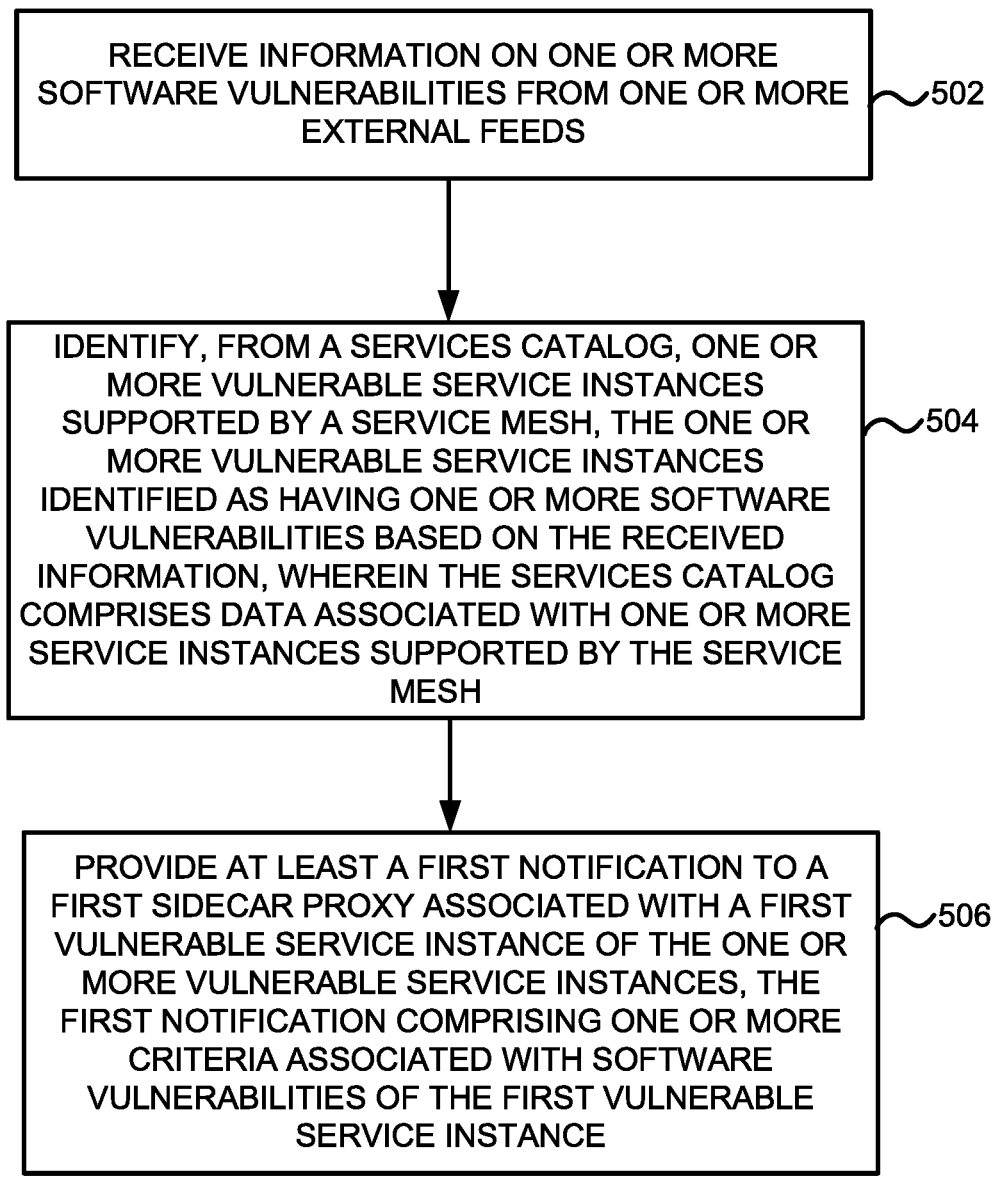
FIG. 5 illustrates an example method for handling software vulnerabilities in a service mesh in accordance with some examples.

Having described example systems and concepts, the disclosure now turns to the method 500 illustrated in FIG. 5. The steps outlined herein are examples and can be implemented in any combination thereof, including combinations that exclude, add, or modify certain steps. The method 500 may be directed to identifying and protecting a service mesh such as the service mesh 302 from software vulnerabilities in service instances supported therein.

At the step 502, the method 500 can involve receiving information on one or more software vulnerabilities from one or more external feeds. For instance, the SVP 318 may receive information on one or more software vulnerabilities through the external feeds 307, 309 from one or more cloud consortia, blockchains, or Product Security Incident Response Team (PSIRT) bulletin boards, etc.

At the step 504, the method 500 can involve identifying, from a services catalog, one or more vulnerable service instances supported by a service mesh, the one or more vulnerable service instances identified as having one or more software vulnerabilities based on the received information, wherein the services catalog comprises data associated with one or more service instances supported by the service mesh. For example, the services catalog 320 may maintain data associated with one or more service instances supported by the service mesh. The data associated with one or more service instances in the services catalog 320 can include, for example, one or more of an operating system version, software version, or dependency packages of the one or more service instances. In one or more examples, the one or more vulnerable service instances may be identified as having one or more software vulnerabilities based on the received information from the external feeds. For example, the SVP 318 may consult the services catalog 320 and determine if any of the service instances with software vulnerabilities reported on the external feeds have a matching entry in the services catalog 320.

At the step 506, the method 500 can include providing at least one notification to at least one sidecar proxy associated with at least one vulnerable service instance of the one or more vulnerable service instances, the at least one notification comprising one or more criteria associated with one or more software vulnerabilities of the at least one vulnerable service instance. The at least one notification can include one or more criteria associated with software vulnerabilities of the vulnerable service instance. For example, the SVP 318 may provide a notification or trigger 311 to the sidecar proxy 324*b* regarding vulnerabilities in the service instance B 328*b*, as discussed in FIG. 3. The one or more criteria in the notification can include one or more criticality levels associated with the software vulnerabilities of the service instance B 328*b*. For example, the one or more criticality levels may be based on a common vulnerability scoring system (CVSS) and indicate numerical scores or criticality level indications such as low, medium, high, and critical. In some examples, the one or more criteria can also comprise one or more categories associated with the software vulnerabilities of the vulnerable service instance. For example, the one or more categories may indicate whether the software vulnerabilities are database related, messaging related, memory related, etc.

In some examples, the notification may further include an instruction to the at least one sidecar proxy to trip a circuit breaker associated with the at least one vulnerable service instance. For example, the notification in the step 406 to the service instance B 328*b* may include an instruction to trip the circuit breaker 326*b*. In some examples, the instruction may be based on the one or more criteria and one or more destination policies for the vulnerable service instance. For instance, destination policies for the service instance B 328*b* may indicate the level of impact for the various criticality levels and also a count of the number vulnerabilities which may be tolerated at the different criticality levels by service instance B 328*b*.

In some examples, tripping the circuit breaker may prevent access to the at least one service instance and cause requests to access the at least one service instance to be returned with a message indicating that the service instance is unavailable. For example, upon tripping the circuit breaker 326*b* in the step 408, the sidecar proxy 328*b* may prevent access to the service instance B 328*b* and cause requests such as the new request in the step 410 to access the service instance B 328*b* to be returned with a message in the step 412 indicating that the service instance B 328*b* is unavailable.

In some examples, the one or more software vulnerabilities of the at least one vulnerable service instance may be reported to an orchestration system for the service mesh. For example, the SVP 318 may report the software vulnerabilities of the service instance B 328*b* to orchestration system 304 in the step 414. In various aspects, the method 500 may further involve determining a fix to the one or more software vulnerabilities of the at least one vulnerable service instance and providing the fix to the at least one sidecar proxy. In some examples, the fix comprises a version of the at least one vulnerable service instance free from the one or more software vulnerabilities of the at least one vulnerable service instance. In some examples, the fix comprises a version of the at least one vulnerable service instance with a patch for the one or more software vulnerabilities of the at least one vulnerable service instance. For example, the SVP 318 may obtain a fix based on a patch or rolling back to a different (clean) version of the service instance B 328*b* as discussed in the foregoing sections.

Figure 6:
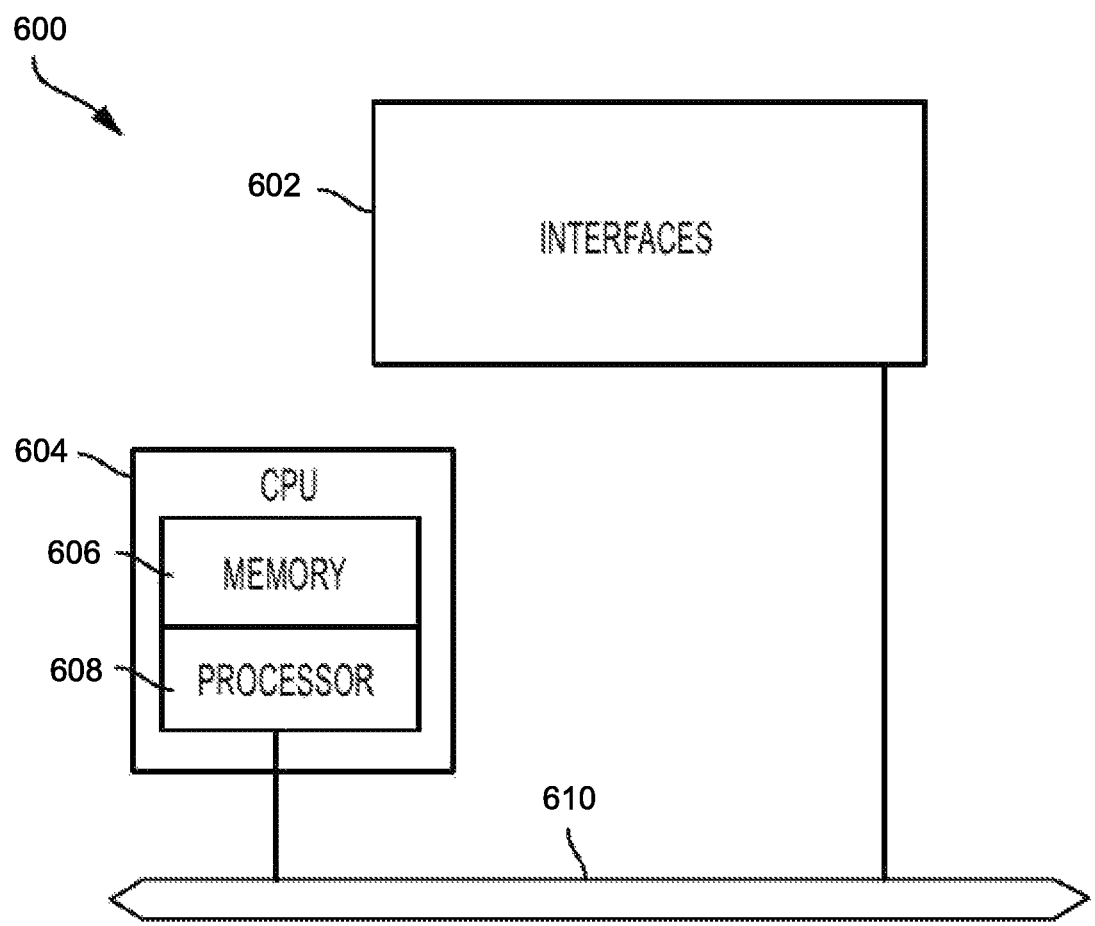
FIG. 6 illustrates an example network device in accordance with various examples.

FIG. 6 illustrates an example network device 600 suitable for implementing the aspects according to this disclosure. In some examples, the control plane 310 and/or the SVP 318 may be implemented according to the configuration of the network device 600. The network device 600 includes a central processing unit (CPU) 604, interfaces 602, and a connection 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. The CPU 604 may include one or more processors 608, such as a processor from the INTEL X86 family of microprocessors. In some cases, processor 608 can be specially designed hardware for controlling the operations of the network device 600. In some cases, a memory 606 (e.g., non-volatile RAM, ROM, etc.) also forms part of the CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 604 to efficiently perform routing computations, network diagnostics, security functions, etc.

Although the system shown in FIG. 6 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the connection 610, to exchange data and signals and coordinate various types of operations by the network device 600, such as routing, switching, and/or data storage operations, for example.

Figure 7:
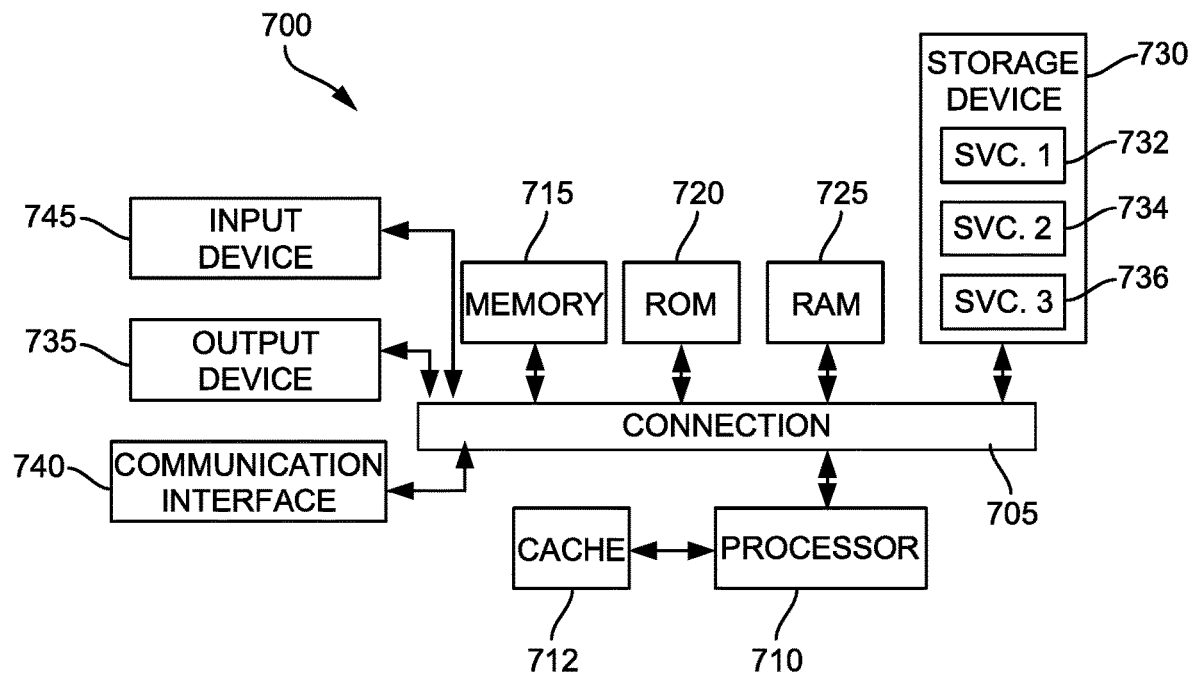
FIG. 7 illustrates an example computing device architecture, in accordance with some examples.

FIG. 7 illustrates an example computing device architecture 700 of an example computing device which can implement the various techniques described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   receiving information on one or more software vulnerabilities from one or more external feeds;
   identifying, from a services catalog, one or more vulnerable service instances supported by a service mesh, the one or more vulnerable service instances identified as having one or more software vulnerabilities based on the received information, wherein the services catalog comprises data associated with one or more service instances supported by the service mesh; and
   providing at least one notification to at least one sidecar proxy associated with at least one vulnerable service instance of the one or more vulnerable service instances, the at least one notification comprising one or more criteria associated with one or more software vulnerabilities of the at least one vulnerable service instance.

2. The method of claim 1, wherein the one or more criteria comprise one or more criticality levels associated with the one or more software vulnerabilities of the at least one vulnerable service instance.

3. The method of claim 2, wherein the one or more criticality levels are based on a common vulnerability scoring system (CVSS).

4. The method of claim 1, wherein the one or more criteria comprise one or more categories associated with the one or more software vulnerabilities of the at least one vulnerable service instance.

5. The method of claim 1, wherein the at least one notification further comprises an instruction to the at least one sidecar proxy to trip a circuit breaker associated with the at least one vulnerable service instance.

6. The method of claim 5, wherein the instruction is based on the one or more criteria and one or more destination policies for the at least one vulnerable service instance.

7. The method of claim 5, wherein tripping the circuit breaker prevents access to the at least one vulnerable service instance and causes requests to access the at least one vulnerable service instance to be returned with a message indicating that the at least one vulnerable service instance is unavailable.

8. The method of claim 1, further comprising reporting the one or more software vulnerabilities of the at least one vulnerable service instance to an orchestration system for the service mesh.

9. The method of claim 1, wherein the one or more external feeds comprise one or more cloud consortia, blockchains, or Product Security Incident Response Team (PSIRT) bulletin boards.

10. The method of claim 1, further comprising determining a fix to the one or more software vulnerabilities of the at least one vulnerable service instance and providing the fix to the at least one sidecar proxy.

11. The method of claim 10, wherein the fix comprises a version of the at least one service instance unaffected by the one or more software vulnerabilities of the at least one vulnerable service instance.

12. The method of claim 10, wherein the fix comprises a version of the at least one vulnerable service instance including a patch for the one or more software vulnerabilities of the at least one vulnerable service instance.

13. The method of claim 1, wherein the data associated with one or more service instances in the services catalog comprises one or more of an operating system version, software version, or dependency packages of the one or more service instances.

14. A system, comprising:
    one or more processors; and
    a non-transitory computer-readable storage medium containing instructions which, when executed on the one or more processors, cause the one or more processors to perform operations including:
      receiving information on one or more software vulnerabilities from one or more external feeds;
      identifying, from a services catalog, one or more vulnerable service instances supported by a service mesh, the one or more vulnerable service instances identified as having one or more software vulnerabilities based on the received information, wherein the services catalog comprises data associated with one or more service instances supported by the service mesh; and
      providing at least one notification to at least one sidecar proxy associated with at least one vulnerable service instance of the one or more vulnerable service instances, the at least one notification comprising one or more criteria associated with one or more software vulnerabilities of the at least one vulnerable service instance.

15. The system of claim 14, wherein the one or more criteria comprise one or more criticality levels associated with the one or more software vulnerabilities of the at least one vulnerable service instance.

16. The system of claim 15, wherein the one or more criticality levels are based on a common vulnerability scoring system (CVSS).

17. The system of claim 14, wherein the one or more criteria comprise one or more categories associated with the one or more software vulnerabilities of the at least one vulnerable service instance.

18. The system of claim 14, wherein the at least one notification further comprises an instruction to the at least one sidecar proxy to trip a circuit breaker associated with the at least one vulnerable service instance.

19. The system of claim 14, wherein the operations further comprise:
reporting the one or more software vulnerabilities of the at least one vulnerable service instance to an orchestration system for the service mesh.

20. The system of claim 14, wherein the operations further comprise:
determining a fix to the one or more software vulnerabilities of the at least one vulnerable service instance and providing the fix to the at least one sidecar proxy.

* * * * *